(12) United States Patent
Paczkowski et al.

(10) Patent No.: US 11,546,866 B1
(45) Date of Patent: *Jan. 3, 2023

(54) NETWORK GENERATED PRECISION TIME

(71) Applicant: T-Mobile Innovations LLC, Overland Park, KS (US)

(72) Inventors: Lyle W. Paczkowski, Mission Hills, KS (US); Peter Paul Dawson, Portsmouth, NH (US); Ronald R. Marquardt, Woodinville, WA (US); Walter F. Rausch, Olathe, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/235,579

(22) Filed: Apr. 20, 2021

Related U.S. Application Data

(63) Continuation of application No. 16/044,235, filed on Jul. 24, 2018, now Pat. No. 11,019,585.

(51) Int. Cl.
*H04W 56/00* (2009.01)
*H04W 12/04* (2021.01)
*G06F 1/12* (2006.01)
*G06F 16/27* (2019.01)

(52) U.S. Cl.
CPC ............ *H04W 56/001* (2013.01); *G06F 1/12* (2013.01); *G06F 16/27* (2019.01); *H04W 12/04* (2013.01)

(58) Field of Classification Search
CPC ....... H04W 56/001; H04W 12/04; G06F 1/12; G06F 16/27
See application file for complete search history.

(56) References Cited

U.S. PATENT DOCUMENTS

| | | | |
|---|---|---|---|
| 6,640,195 B1 | 10/2003 | Bayerl et al. | |
| 10,334,545 B2 | 6/2019 | Bjorkengren | |
| 2002/0129290 A1 | 9/2002 | Couillard | |
| 2002/0129291 A1 | 9/2002 | Gonzalez | |
| 2003/0152177 A1 | 8/2003 | Cahill-O'Brien et al. | |
| 2004/0232956 A1 | 11/2004 | Nguyen et al. | |
| 2005/0050424 A1* | 3/2005 | Matsuura | H04L 47/28 714/748 |
| 2005/0091554 A1* | 4/2005 | Loukianov | G06F 1/14 713/500 |
| 2005/0289405 A1* | 12/2005 | Rivoir | G06F 1/12 714/700 |
| 2006/0129585 A1* | 6/2006 | Ishiki | G06F 15/17337 |
| 2009/0100512 A1 | 4/2009 | Schneider | |
| 2011/0239034 A1* | 9/2011 | Okuda | H03L 7/0812 713/503 |
| 2012/0233117 A1 | 9/2012 | Holt et al. | |
| 2014/0064303 A1 | 3/2014 | Aweya et al. | |
| 2015/0263966 A1* | 9/2015 | Blake | H04L 47/562 370/229 |
| 2015/0295720 A1 | 10/2015 | Buldas et al. | |
| 2015/0346760 A1 | 12/2015 | Kishiro et al. | |

(Continued)

*Primary Examiner* — Javier O Guzman

(57) ABSTRACT

Precision digital chronography based on detected changes in state of a processor is described. The changes in state may be detected by another processor and an averaged time interval generated. A signal corresponding to the averaged time interval may be communicated to a distributed database and propagated to remote systems. Devices associated with the remote systems may adjust or set a device clock in accordance with the averaged time interval.

20 Claims, 7 Drawing Sheets

(56) References Cited

U.S. PATENT DOCUMENTS

| | | |
|---|---|---|
| 2016/0205517 A1* | 7/2016 | Luo .................. H04W 4/12 |
| | | 455/518 |
| 2016/0261567 A1 | 9/2016 | Baskaran |
| 2016/0328713 A1 | 11/2016 | Ebrahimi |
| 2017/0094618 A1 | 3/2017 | Bjorkengren |
| 2018/0246555 A1 | 8/2018 | Matsuo et al. |
| 2019/0112075 A1 | 4/2019 | Kalmar et al. |
| 2019/0361744 A1 | 11/2019 | Koda |
| 2020/0019517 A1 | 1/2020 | Chazot et al. |

\* cited by examiner

NETWORK GENERATED PRECISION TIME

CROSS-REFERENCE TO RELATED APPLICATIONS

This application is a continuation of and claims the benefit of the U.S. Non-provisional application Ser. No. 16/044,235, filed on Jul. 24, 2018 which is hereby incorporated herein in its entirety by reference.

BRIEF SUMMARY

A high-level overview of various aspects of the technology described herein is provided as an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter.

Aspects described herein generally relate to the generation of precision time. For example, some aspects described herein are directed to computer-implemented methods for generating a digital chronographic reference signal. In an aspect, the method comprises generating, by each processor in a first set of processors a corresponding plurality of outputs based on a program executed by each processor in the first set, wherein each corresponding plurality of outputs indicates at least a corresponding first change of state based at least in part on the executed program, the corresponding first change of state representing a corresponding first time interval. The method further comprises generating, by a second processor, at least a first averaged time interval based on each corresponding first change of state indicated in the plurality of outputs generated by the first set of processors. Additionally, the method comprises transmitting, over a network, at least a first signal to one or more remote computing devices, the first signal being transmitted in accordance with the generated first averaged time interval. A remote computer may determine a predetermined time interval based on the transmission of at least the first signal. Further, in response to the predetermined time interval, a device clock may be adjusted by the predetermined time interval from a first time to a second time. Although described in more detail below the signal may comprise a signed hash value generated from a private key paired with a public key, may be transmitted to a distributed database, and/or may be assigned a transaction number by the distributed database.

Some aspects herein are directed to a system for digital chronography based on a reference signal generated in response to detected changes in state of a set of processors. In an aspect, the system comprises a processor and a set of computer codes that when executed by the processor cause the processor to perform operations. The operations may comprise receiving a first signal corresponding to a generated averaged time transmitted over a network. Further, responsive to receipt of the first signal, a local time is determined in accordance with the generated average time.

Some aspects herein are directed to non-transitory storage media storing computer instructions that when executed by at least one processor cause the at least one processor to perform operations. In an aspect, the operations comprise providing a public key to a device storing an instance of a distributed database. Further, detecting a communication of a signed hash value from at least one blade server to the distributed database, the signed hash value generated based on a captured change in state of a processor associated with the at least one blade server. In response to the detection, determining a predetermined time interval corresponding to the captured change in state of the processor and a device clock is automatically adjusted in accordance with the predetermined time interval.

Some aspects herein are directed to a method for digital chronography. In an aspect the method comprises transmitting, over a network, a signed hash value from a blade server to a distributed database for storage, the signed hash value generated from a change in state of a processor captured by the blade server and based on the transmitting, determining a predetermined time interval, wherein the determining operation is performed by a remote device with a public key associated with the hash value. Further, the remote device clock may be adjusted or set in accordance with the predetermined time interval.

BACKGROUND

Precision wireless network timing is crucial for network operation. For example, in time division duplex wireless communication networks the precision timing signal is used to, amongst other things, orchestrate when the user device transmits and the base station listens, and when the base station transmits and the user device listens. Loss of timing signals may lead to rapid network degradation and ultimately service termination. Generally speaking, current precision timing is handled by the global positioning system (GPS) or other global navigation satellite systems (GNSS) (such as GLONASS, Galileo, Beidou, and so on). GNSS's broadcast radio signals providing the satellites location and a time. Those skilled in the art will understand the processes such systems utilize to determine the time. However, GNSS systems are subject to compromise (such as hacking or hijacking), natural interference (such as solar flares), and artificial interference (such as jamming or anti-GPS devices, governmental control of signal).

In the event of a temporary loss of timing signal, current systems may be able to operate for several hours before network degradation ensues, potentially resulting in service termination. However, as wireless networks, user devices, and the internet of things becomes more prevalent, precision network timing becomes more crucial. Further, the $5^{th}$ generation of wireless communication networks (5G) will place much higher demands on precision timing networks that may turn the loss of signal operational window from hours to minutes. Accordingly, there is a technologic need for a reliable, trusted, highly precise, terrestrial timing signal.

BRIEF DESCRIPTION OF THE DRAWINGS

Illustrative embodiments of the present invention are described in detail below with reference to the attached drawing figures, and wherein.

DETAILED DESCRIPTION

The subject matter of the technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

As used herein unit prefixes, such as μ (micro), p (pico), f (femto) are used in there standard meaning according to the International System of Units (SI). For example, 1 μs=0.000001 seconds=$1 \times 10^{-6}$ seconds. However, it will be understood by those skilled in the art that references made herein to a "micro cell" or a "femto cell" are used in the commonly understood context of the industry and not necessarily as a literal SI prefix. Additionally, the customary SI unit abbreviations are used herein with the standard meaning. For example, and as illustrated above, s=second(s). In another example, Hz=Hertz=cycle/second. Accordingly, a cycle occurring every ns=1 GHz.

The subject matter described herein is generally described in the context of a wireless communications network. This is done merely for the sake of clarity and those skilled in the art may, upon reading this description, understand other contexts in which the subject matter may be utilized. For example, the inventors have contemplated the subject matter described herein in the context of infrastructure networks (such as an A/C power grid), economic networks (such as high-frequency trading, flash trading, and generalized electronic trading), air traffic control networks, first responder networks (such as EMS, police, fire rescue, and the like), amongst others. Again, however, even these examples are not provided to limit the scope of this description.

Figure 1:
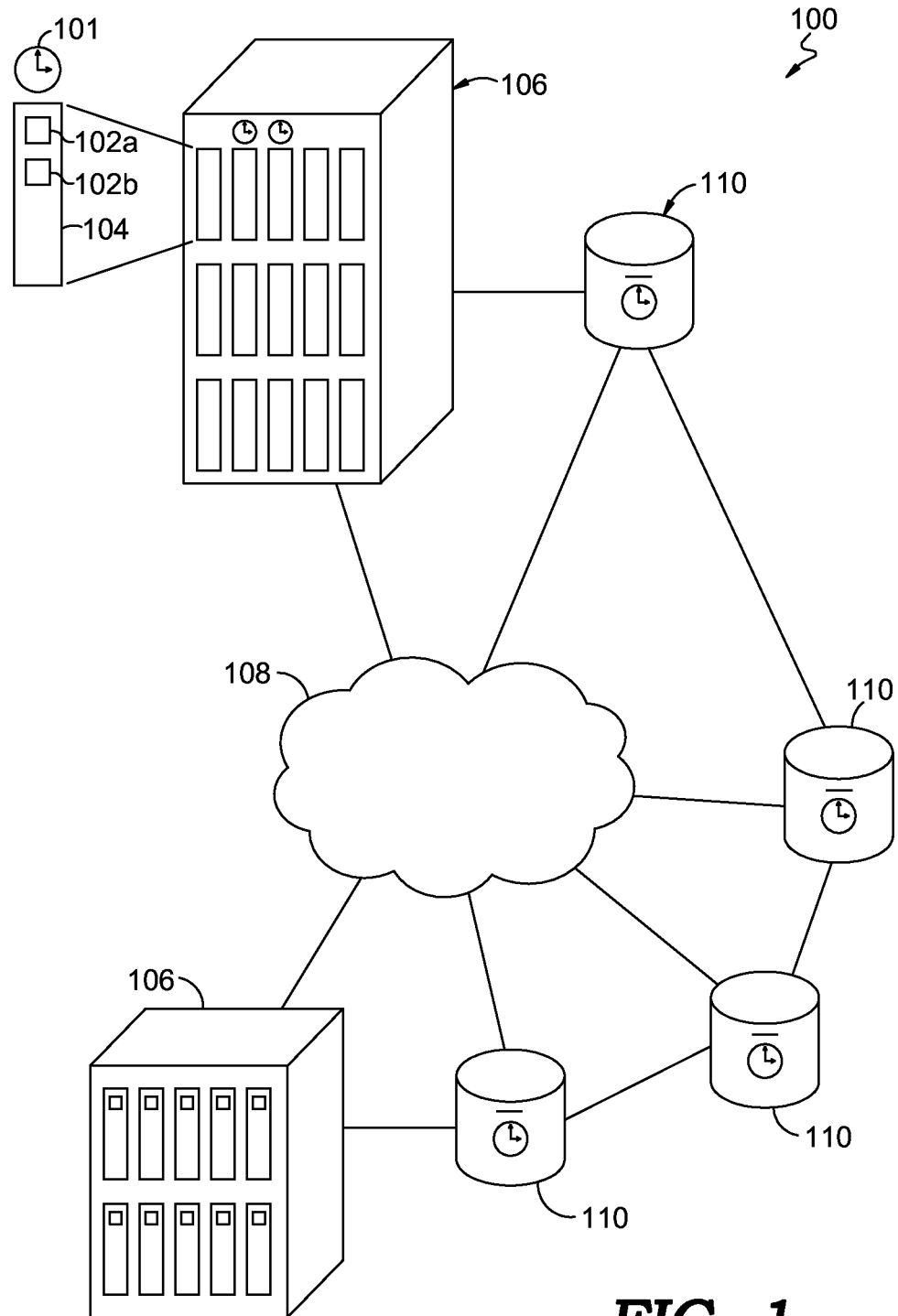
FIG. 1 depicts an exemplary environment suitable for use in implementing aspects herein.

With reference to FIG. 1, a network environment suitable for use in implementing embodiments of the present disclosure is provided. Such a network environment as illustrated in FIG. 1 is designated generally as network environment 100. Network environment 100 is but one example of a suitable network environment and is not intended to suggest any limitation as to the scope of use or functionality of the disclosure. Neither should network environment 100 be interpreted as having any dependency or requirement relating to any one or combination of components illustrated.

Network environment 100 generally comprises a processor 102a, a processor 102b, a computing device 104, a network 108, and a database 110. Additionally, some aspects of network environment 100 comprise server 106, more than one processor 102a, more than one processor 102b and/or more than one computing device 104. Broadly speaking, network environment 100 facilitates the generation, propagation, and recordation of averaged time interval 101.

Processor 102a is generally a processor specially configured to execute a program that generates output based on a change of state of at least processing core of the processor 102a. For example, in some aspects Processor 102a is a specially configured reduced instruction set computing (RISC) processor, ARM processor, Application-Specific Integrated Circuit (ASIC), complex instruction set computing (CISC) processor, or custom silicon processor (CSP), such as may be and/or may become available from ARM, Sun, IBM, Intel, or the like. Processor 102a may be specially configured in a number of ways. For example, processor 102a may be customized such that at least one core of the processor 102a changes state every fs, ps, ns, μs, ms, cs, ds, and/or about every fs, ps, ns, μs, ms, cs, ds. The change in state can be determined by output in a variety of forms; such as a change in voltage, a binary data stream (i.e. a string of 1's and 0's), a predetermined value (set of values) in a predetermined register (set of registers), or the like. For example, processor 102a may be monitored by a zero crossing detector, a threshold detector, and/or a threshold limiter integrated with computing device 104. In such an embodiment, as the voltage of the processor 102a crosses or substantially approaches zero V, and/or crosses or substantially approaches a predetermined threshold V, and output is generated by the zero crossing detector, threshold detector, and/or threshold limiter. In another example, processor 102a may be physically and/or programmatically configured to write, or modify in a predetermined way (by for example changing a 1 to a 0 or 0 to a 1, or adding a 1 or 0), a value in a register accessible by processor 102a. Generally speaking however, the output indicates a change of state of a processor, such as processor 102a.

In another example, processor 102a may be specially configured such that one operational cycle including at least one change of state and a corresponding output is completed by the processor 102a every fs, ps, ns, μs, ms, cs, ds, and/or about every fs, ps, ns, μs, ms, cs, ds. Said another way, in some aspects the processor 102a may generate an output at a clock speed of a peta Hz (PHz), tera Hz (THz), giga Hz (GHz), mega Hz (MHz), and so on. In some aspects, processor 102a may generate an output at a clock speed of about a PHz, THz, GHz, MHz and so on. Additionally, and/or alternatively, processor 102a may be specially configured such that in combination with embedded instructions and/or non-embedded instructions causes at least one change of state and a corresponding output is completed by the processor 102a every fs, ps, ns, μs, ms, cs, ds, and/or about every fs, ps, ns, μs, ms, cs, ds. In other words, in some aspects processor 102a is a specially designed processor that is physically and/or programmatically configured to change state every femto second (fs) or about every femto second. In some aspects, processor 102a is a specially designed processor that is physically and/or programmatically configured to change state every pico second (ps) or about every pico second. In some aspects, processor 102a is a specially designed processor that is physically and/or programmatically configured to change state every nano second (ns) or about every nano second. In some aspects, processor 102a is a specially designed processor that is physically and/or programmatically configured to change state every micro second (μs) or about every micro second. In some aspects, processor 102a is specially designed processor that is physically and/or programmatically configured to change state at a predetermined time interval that is ≤1 second. In some aspects, processor 102a is specially designed processor that is physically and/or programmatically configured to change state at a predetermined time interval that is ≥1 femtosecond. In view of the description, the design and fabrication of such a specially configured RISC, ARM, ASIC, CSP, and/or CISC processor will be understood by those skilled in the art. In some aspects, processor 102a is one, more than one, or a plurality of processors. Additionally, in some aspects, processor 102a is specifically configured to only boot and/or execute programs that is digitally signed by a certifying authority. Thereby allowing downstream trust of the output from processor 102a as a valid change in state. In some aspects, the certifying authority may digitally sign the program with a private certificate of authority. In some aspects, the certificate of authority may indicate the particular time interval associated with the program/hardware combination. For example, a first certificate of authority may be used to sign a program that is executed by a processor to generate a change in state every µs or about every µs; a second certificate of authority may be used to sign a program that is executed by a processor to generate a change in state every ns or about every ns; and so on. A public certificate of authority may be provided to subscribing devices, an impulse averaging module, and/or other systems as described herein.

Processor 102b may be a specially configured reduced instruction set computing (RISC) processor, ARM processor, Application-Specific Integrated Circuit (ASIC), complex instruction set computing (CISC) processor, or custom silicon processor (CSP), such as may be and/or may become available from ARM, Sun, IBM, Intel, or the like. Processor 102b is generally a processor configured to detect and/or monitor the output (change in state) of processor 102a. Further, processor 102b may perform operations and/or facilitate functions described in relation to computing device 104. As depicted in FIG. 1, in some aspects processors 102a and 102b may be physically distinct processors. However, in some aspects processors 102a and 102b may be processing cores in a processor. For example, a processor may have two, three, or more processing cores with at least one core functionally equivalent to processor 102a and at least one core functionally equivalent to processor 102b.

Computing device 104 generally includes a one or more busses that directly or indirectly couples the following devices: memory, one or more processors including at least one processor 102a and 102b, one or more presentation components, input/output (I/O) ports, input/output components, and an illustrative power supply. For example, computer device 104 may include some and/or all of the components of computer device 700 (as described in reference to FIG. 7) and at least one processor 102a and 102b. In some aspects, computing device 104 monitors processor 102a for outputs indicating at least a corresponding change of state of processor 102a. For example, processor 102b of computing device 104 may monitor and/or read a register that processor 102a is configured to write or modify. In another example, processor 102b of computing device 104 may receive input from a zero crossing detector, a threshold detector, and/or a threshold limiter that is monitoring the changes of state of processor 102a. It will be understood by those skilled in the art that these are intended as non-limiting examples.

In some aspects, computer device 104 may be a blade in a rack enclosure or a rack mountable computing component and Server 106 is a blade server housing a plurality of computer devices including at least one computer device 104.

Server 106 generally includes a plurality of computing devices, such as computing device 104. Generally, a server, as the term is used in this specification, refers generally to a multi-user computer that provides a service (e.g. database access, file transfer, remote access) or resources (e.g. file space) over a network connection. The term 'server,' as context requires, refers inclusively to the server's computer hardware as well as any server application software or operating system software running on the server. A server application is an application program that accepts connections in order to service requests from users by sending back responses. A server application can run on the same computer as the client application using it, or a server application can accept connections through a computer network. Examples of server applications include file server, database server, backup server, print server, mail server, web server, FTP servers, application servers, VPN servers, DHCP servers, DNS servers, WINS servers, logon servers, security servers, domain controllers, backup domain controllers, proxy servers, firewalls, and so on. In some aspects, Server 106 is a blade server comprising a plurality of computing devices 104. Blade servers are self-contained servers, designed for high density and interchangeability of individual blades (such as some aspects of computing device 104). In some aspects, computer device 104 is a blade in a rack enclosure or a rack mountable computing component and server 106 is a blade server housing a plurality of computer devices including at least one computer device 104. In some aspects, the server may generate an average time interval that is based on a corresponding change of state of a plurality of processors 102a locally and/or remotely in communication with server 106.

Time interval 101 is generally a predetermined period of time ≤1 s and ≥1 fs for example the predetermined interval may be a fs, ps, ns, µs, ms, cs, ds, and/or about a fs, ps, ns, µs, ms, cs, ds. In some aspects, the time interval 101 is an output signal generated based on a change of state of a processor, such as processor 102a. The time interval 101 may be generated by a detected change in voltage of processor 102a. For example, the change in voltage may occur during a computational cycle of processor 102a and may indicate a change of state of the processor 102a. The time interval 101 may be generated by processor 102a writing and/or otherwise modifying a value to a register associated with processor 102a. For example, the processor 102a may execute a program, authenticated by a certificate of authority that causes the processor 102a to write and/or modify a predetermined value to a register every computational cycle of the processor 102a. The written and/or modified value may indicate a change of state of processor 102a.

Network 108 is configured to allow network connections between a computer device 104 and/or server 106 and other devices, such as devices storing databases or particular instances of a distributed database (such as database 110). Additionally, network 108 is configured to allow network connections between a database, another database, and/or subscribing devices. The network 108 may be configured to employ a means of communicating information from one computing device to another, such as through a universal serial bus (USB) port, Ethernet link, fiber optic link, or any combination thereof. In one aspect, the network 108 may be the Internet, or may include local area networks (LANs), wide area networks (WANs), or direct connections. In one aspect, the network 108 may include wireless and/or wired connections.

Database 110 can take the form of a distributed database, distributed ledger (such as a hyper ledger, block chain, and so on) or any other public or private distributed database. The database 110 is connected and can be adapted to communicate over a public computer network, the internet, an intranet, an extranet, or any private communication network. Generally, the database 110 is accessible by any device that has an Internet connection over a network. A distributed ledger, such as block chain, as is known in the art, is a system that enables users' access to securely store data in a public place or private place. The data stored in the block chain is deemed secure, as each time data is written to the system, the written data is dependent on previously written data, which can include performing cryptographic operations to hash the data. One benefit of using a distributed database, such as a distributed ledger like block chain, is that once data is written to the block chain and a block chain transaction is created, that transaction remains intact, and can be verified in the future. The reason for this, is that data is continually written to the distributed ledger, e.g., after a particular transaction is made, and that later data is dependent on an earlier particular transaction. Accordingly, by writing the averaged time interval data to a distributed storage network, such as database 110,210, subsequent verification of that data is practically ensured to be accurate. In some aspects, the distributed database is a public block chain, which receives data for storage, such as data set 450, from one, one or more, and/or a plurality of entities. The entities need not be related, and the type of data need not be the same. In general, entities storing instances of the block chain are unrelated, and the type of data can vary to almost any type of digital data, e.g., not limited to identity data, commercial data, cryptocurrency data, average time interval, etc. However, in some aspects, the entities storing instances of the distributed database, such as a block chain, are associated with one, one or more, or a plurality of subscribers to and/or operators of a digital chorography service. Thus, the data received for storage is configured to be processed to generate a dataset that is dependent on previous data stored to the block chain. Accordingly and as a product of the dataset's dependency on the previous data stored to the distributed database the distributed database ensures that datasets stored to the block chain are not modifiable (i.e. immutable), as each later dataset stored to the distributed database continues to be dependent on previous dataset stored to the distributed database. In some aspects, the distributed database (such as database 110,461) is a private block chain, which receives data for storage from one or more computing devices at least partially dedicated to producing average time intervals (such as computing device 104) and/or one or more servers at least partially dedicated to producing average time intervals (such as server 106).

Figure 2:
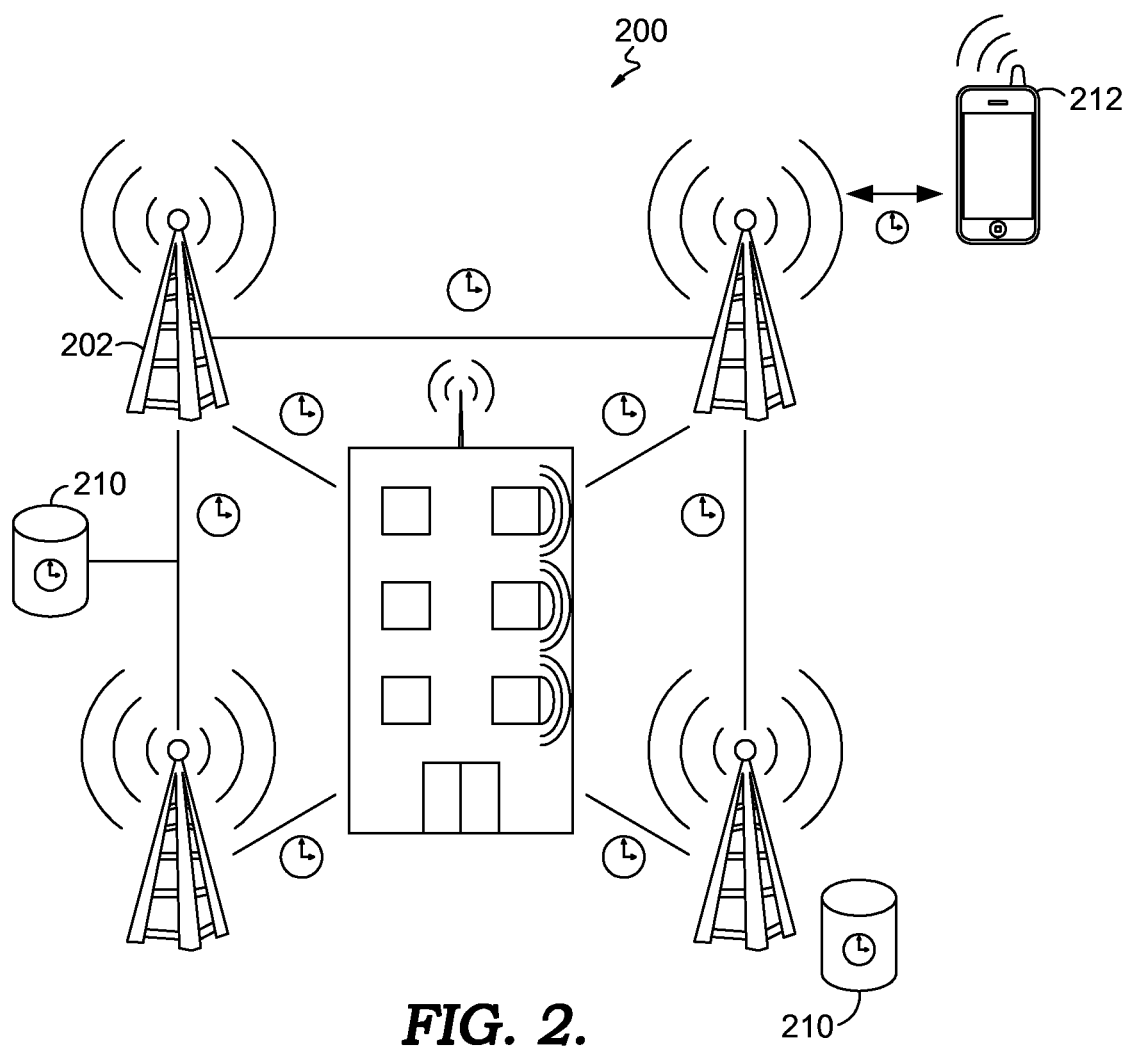
FIG. 2 depicts another exemplary environment suitable for use in implementing aspects herein.

With reference to FIG. 2, an example environment is depicted illustrating aspects described herein implemented in a communication network 200. Generally, communication network 200 comprises base station(s) 202, database(s) 210, and user device 212. It will be understood by those skilled in the art that a communication network, such as communication network 200, may include an array of devices or components, some of which are not shown so as to not obscure more relevant aspects of the invention. Components such as terminals, links, and nodes (as well as other components) may provide connectivity in some embodiments. In aspects, network 200 is associated with one or more communications provider that provides services to user devices, such as user device 212. For example, network 200 may provide voice and/or data services to user devices or corresponding users that are registered or subscribed to utilize the services provided by a communications provider. Network 200 can be any communication network providing voice and/or data service(s), such as, for example, a 1× circuit voice, a 3G network (e.g., CDMA, CDMA2000, WCDMA, GSM, UMTS), a 4G network (WiMAX, LTE, HSDPA), a 5G network, a 6G network, or the like.

Database 210 may be any type of medium that is capable of storing information. In some aspects, Database 210 comprises at least one instance of a database that is part of a distributed database, such as database 110,461. Database 210 may push, transmit, send, provide access to, or otherwise communicate a dataset (such as dataset 450 as discussed in reference to FIG. 4) and/or a hash 460 stored in the database 210 to a base station 202. In some aspects, database 210 communicates the dataset to base station 202 in response to a receiving a cryptographic key from base station 202. Database 210 may add base station 202 to a subscriber list after the cryptographic key is provided.

In aspects, base station 202 is a wireless communications station that is installed at a fixed location, such as a communication tower, as illustrated in FIG. 2. The communication tower may be a structure designed to support one or more antennas for communications and/or broadcasting. In other embodiments, base station 202 is a mobile base station, small cell, mini cell, micro cell, pico cell, and/or a femto cell. The base station 202 may be an eNode B in an LTE telecommunications network and may be used to communicate as part of the wireless communications network. In this way, base station 202 can facilitate wireless communications between user device 212 and other devices, user devices, the Internet, and/or network 200. The base station 202 may include at least one baseband unit (BBU) responsible for, among other things, digital baseband signal processing. For instance, CDMA/EVDO and LTE Internet protocol (IP) packets are received from a wireless communications network and are digitally combined by the BBU at the base station 202. The blended digital baseband signal is transmitted to a radio at the base station 202. Digital baseband signals received from the radio are demodulated by the BBU and the resulting IP packets are transmitted by the BBU to the network. The base station 202 may include a radio (not shown) or a remote radio head (RRH) that generally communicates with one or more antennas associated with the base station 202. The base station may support multiple-input-multiple-output (MIMO) and/or time division duplex or any other suitable communication protocols. In some aspects, base station includes a database 210. In some aspects, base station 202 includes a base station clock (device clock) that facilitates time division duplex, MIMO, and or other communication protocols supported by base station 202 between the base station and one or more user devices (such as user device 212). The base station 202 may receive a dataset (such as data set 450) and or a hash (such as hash 460) and adjust the device clock from a first time to a second time in accordance with the average time interval as described herein. Additionally, the base station may verify the authenticity of the dataset by validating the hash 460 and/or the system signature 456 as described herein or as will be apparent in light of this description.

User device 212 can communicate with other devices, such as mobile devices, servers, etc. The user device 212 can take on a variety of forms, such as a personal computer, a laptop computer, a tablet, a netbook, a mobile phone, a smart phone, a personal digital assistant, or any other device capable of communicating with other devices by way of a network. Makers of illustrated user devices include, for example, Research in Motion, Creative Technologies Corp., Samsung, Apple computers, Nokia, Motorola, and the like. A user device 212 may comprise, for example, a display(s), a power source(s) (e.g., a battery), a data store(s), a speaker(s), memory, a buffer(s), and the like. In embodiments, user device 212 comprises a wireless or mobile device with which a wireless telecommunications network(s) can be utilized for communication (e.g., voice and/or data communication). In this regard, the user device 212 can be any mobile computing device that communicates by way of, for example, a 3G, 4G, or 5G network. User device 212 may connect, at least temporarily, to base station 202. In an aspect, base station 202 may use the base station's device clock to synchronize communications with user device 212.

Figure 3:
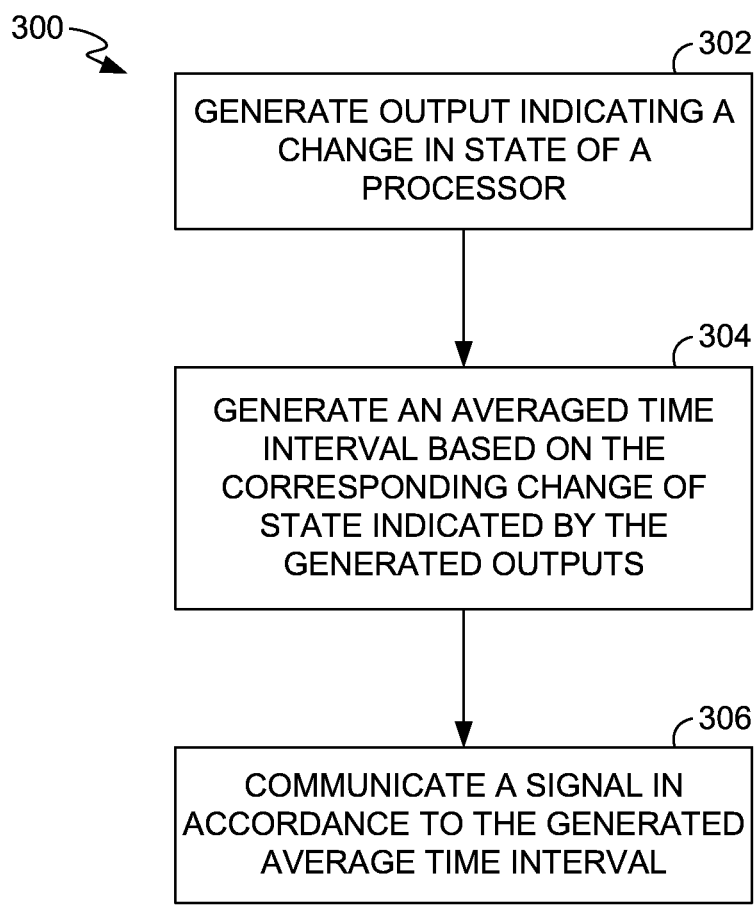
FIG. 3 depicts an exemplary method for generation of an averaged time interval, according to an aspect herein.
Figure 4:
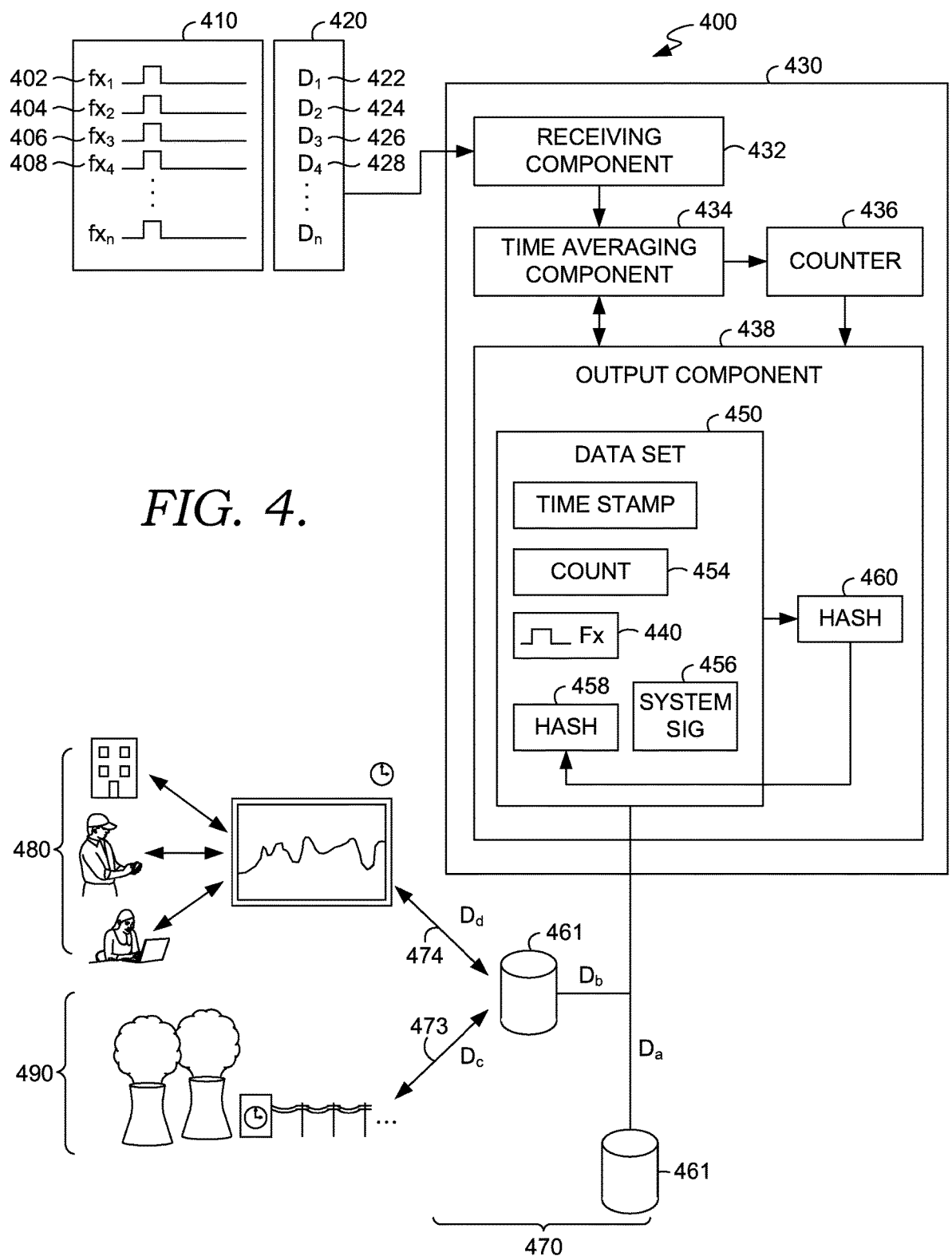
FIG. 4 depicts an exemplary process for the generation and propagation of an averaged time interval, according to an aspect herein.

With reference to FIGS. 3 and 4, a method 300 and process 400 for generating a digital chronographic reference signal in accordance with aspects disclosed herein is provided. Generally, the method 300 comprises generating outputs for a program executed by a processor that correspond to a change of state, generating an averaged time interval based on each corresponding change of state, and transmitting a signal to a remote computing device in accordance with the averaged time interval. In some aspects, method 300 and/or process 400 is facilitated by a specialized system, such as described in relation to FIGS. 1 and 2. Those skilled in the art will understand that, although process 400 depicts what would be commonly recognized as a change in voltage as the detected change in state, this is merely to ensure clarity in the description provided herein. Accordingly, it should not be interpreted as limiting the scope of the embodiments described herein.

At block 302, at least one processor generates outputs based on a program executed by the processor indicating a change in state of the processor caused by the execution of the program. In some aspects the processor is at least on processor 102a as described with reference to FIG. 1. The output from the at least one processor can take a variety of forums such as a change in voltage, a binary data stream (i.e. a string of 1's and 0's), a predetermined value (set of values) in a predetermined register (set of registers), or the like. Generally speaking however, the output indicates a change of state of a processor, such as processor 102a. For example, a program executed by at least one processor, such as processor 102a, may cause a change of state (i.e. from a 1 to a 0 or from a 0 to a 1) every fs, ps, ns, μs, ms, cs, ds, and/or about every fs, ps, ns, μs, ms, cs, ds. In an aspect, the outputs indicating a change in state of the processor are captured by a blade in a blade server. In another example, a plurality of changes in state, corresponding with each other, may be detected by a plurality of zero crossing detectors, threshold detectors, and/or threshold limiters monitoring changes in voltage of a corresponding plurality of processors (such as processor 102a). Those skilled in the art will understand that, in practice, processors, busses, registers, power supplies, voltage detectors, and for that matter nearly all of the components in a computer are not literally identical and some variations in the outputs 410 may exist even if exceptionally minor. As such, a considerable technological limitation of networks requiring precision time can be that even if the physical components are all sourced from the same lot, same cast, and as nearly identical handling and assembly conditions; these otherwise, potentially minor variations can prevent consistent, reliable, and accurate network time.

Accordingly, at block 304, at least one processor generates an averaged time interval based on the corresponding change of state indicated by the generated outputs. In some aspects, the generated outputs are the outputs of block 302. In some aspects, the outputs are generated by least one processor, such as processor 102a. In some aspects, the outputs are received, directly or indirectly, by at least one processor associated with computing device 104. In some aspects, the outputs are received, directly or indirectly, by at least one processor associated with server 106. For example, at block 304, the plurality of the outputs 410 corresponding to the detected changes in state can be sent by at least one processor (such as processor 102b) via an I/O component of computing device 104 to a receiving component 432 of an impulse averaging module 430 operating on a server, such as server 106. In an aspect, impulse averaging module 430 can be a physical component of a server, such as server 106. In an aspect, impulse averaging module 430 can be a program, application, and/or a combination of hardware and software integrated with a server such as server 106. The receiving component 432 may parse the outputs 410 from processors 102a (sent by processors 102b) and provide the averaged time interval component 434 with the outputs and identify the source processor (such as the processor 102a and/or processor 102b).

In some aspects, the averaged time interval is programmatically determined by the averaged time interval component 434 based on the averaged frequency of a set of corresponding outputs from more than one processor such as processor 102a. For example, a system comprising X processors 102a, the averaged time interval may be expressed, in the most basic form as the sum of the frequency of the corresponding outputs from X processors 102a, divided by X; or by Formula 1.

$$\frac{\sum f^x}{x} = \overline{F} = \text{Averaged Time Interval} \qquad (1)$$

Said another way, if the system comprises 4 processors 102a, the averaged time interval may be expressed at the sum of output 402, output 404, output 406, and output 408 divided by 4. Additionally, and/or alternatively, Formula 1 may also comprise a correction factor for each output of the at least one processor, such as processor 102a, based on the physical configuration of the processors generating the outputs. For a non-limiting example, the distance (or a portion of the distance) between each processor 102a and the processor(s) determining the average time interval, any transmission delays created by differences in transmission modality (such as fiber optic, Ethernet, Cat5e, Cat6, T1, analog, and similar), subcomponent architecture, bus speed, and/or any other unintentional delay creating features. For example, averaged time interval component 434 may determine the averaged time interval for the plurality of outputs 410 by compensating for the plurality of delays 420. Accordingly, in some aspects, the average time interval is determined by the sum of the corrected frequency of the corresponding outputs from X processors 102a, divided by X, as expressed by the Formula 2.

$$\frac{\sum f^x \pm \text{correction factor}}{x} = \overline{F} = \text{Averaged Time Interval} \qquad (2)$$

Said another way, if the system comprises 4 processors 102a, the averaged time interval may be expressed at the sum of (output 402±correction factor based on $D_1$ 422, output 404±correction factor based on $D_2$ 424, output 406 correction factor based on $D_3$ 426, and output 408±correction factor based on $D_4$ 428) divided by 4. It will be understood by those skilled in the art that the correction factor will vary widely depending on the specific environment in which method 300 is implemented.

In an illustrative example, in some aspects, two or more servers (such as two or more server 106) may be communicatively coupled directly or indirectly through a fiber optic cable and the computing devices monitoring the processors 102*a* may be locally communicatively coupled through Ethernet. In such an aspect, the correction factor for an output from a given processor 102*a* may comprise a correction for locally created delays and a correction for the delay created by transmission through the fiber optic cable. Additionally, in some aspects, impulse averaging module 430 may be facilitated by a dedicated server (not depicted) of server blade communicatively coupled to one or more servers 106. Accordingly, as will be understood by those skilled in the art, impulse averaging module 430 may correct delays caused by communicating the outputs, such as outputs 410, corresponding to changes in state of processors 102*a* over both relatively long and relatively short distances.

In some aspects, in response to the impulse averaging module 430 determining the averaged time interval a local master clock is adjusted by the averaged time interval. For example, the local master clock may be adjusted by a fs, ps, ns, µs, ms, cs, or ds based on the averaged time interval. In some aspects, impulse averaging module 430 further comprises a counter component 436 that incrementally increases a numerical value in response to the averaged time interval component 434. For example, each time the average time interval component processes a set of outputs, such as outputs 410, counter component 436 increases the numerical value by 1 (i.e. from 0 to 1, from 1 to 2, from 2 to 3, and so on).

In some aspects, block 304 further comprises generating a hash value based on a data set. The data set may comprise the generated averaged time interval, a time stamp indicating the local master clock's time, a count, a system signature, and/or the hash of the previous data set. In some aspects, block 304 may be facilitated by an output component of an impulse averaging module (such as output component 438 and impulse averaging module 430). For example, an output component 438 of the impulse averaging module 430 may generate a data set 450 by receiving/collecting/accessing the averaged time interval 440 from the averaged time interval component 434, a time stamp 452 from the master clock, a system signature 456, and/or the hash of the previous data set 458. The system signature 456 may be based on a public certificate of authority used to validate the program run by processor 102*a*, a set of specifications of processor 102*a*, processor 102*b*, and/or computer device 104. The output component 438 may use the data set 450 as input data in a hashing algorithm to generate a hash value 460. In some aspects, the hash value is generated by software, firmware, hardware, and/or a combination thereof, comprising one or more hashing algorithms, such as a Secure Hash Algorithm (SHA) algorithm, or similar cryptographic algorithms.

In some aspects the resulting hash value 460 may be signed with a digital signature, created using a private key associated with the impulse averaging module 430, the server hosting the impulse averaging module 430, the certificate of authority, and/or the entity operating the system. The private key may be paired with a public key held by subscribing devices. In some aspects the resulting hash value 460 may be signed with a digital signature comprising one or more public keys, directly or indirectly, to the impulse averaging module 430. The public key may be paired with a private key held by subscribing devices.

At block 306, a signal is communicated over a network to remote devices in accordance with the generated average time interval. In some aspects the generated average time interval is from block 304. In some aspects, the signal comprises the generated hash value from block 304 and/or the data set 450. The signal may be sent to a plurality of distributed databases (such as database 110,210,461) for storage as an entry through a network (such as network 108). As will be understood by those skilled in the art, communicating the signal to the distributed databases may introduce a delay. In some aspects, a distributed database also stores a table of correction factors (not depicted) that facilitate compensating for the time delay that may be created by the communication pathway through the network (such as network 108). For example, latency may be detected and compensated for by the distributed databases 110,210,461. In some aspects, method 300 additionally comprises storing the data set 450 and/or the hash 460 in a distributed database, such as database 110, 210, 461. The distributed database may assign a transaction number to the data set 450 and/or the hash 460. The distributed database can provide access, communicate, send, or otherwise facilitate propagation of the data set 450 and/or the hash 460 in accordance with the generated average time interval to subscribing devices. As described above, the generated average time interval can be a fs, a ps, a ns, a µs, a ms, a cs, a ds, and/or a predetermined interval ≥1 fs and ≤1 s. For example, a server hosting a financial exchange 480, a server facilitating the oversight and control of a power plant or power grid 490, and/or a communication network 200 can access or receive the data set in accordance with the generated average time interval. In some aspects, a subscribing device provides a key to the distributed database. In some aspects the subscribing device provide a public key associated with the private key used to sign the data set. In some aspects the subscribing device provides a private key associated with the one or more public keys used to sign the data set. The subscribing device may then set/adjust the device's clock in accordance with the average time interval.

Thus, in some aspects a set of specially configured processors generate outputs, directly (by for example writing a value to a register) or indirectly (by for example a detected change in voltage), based on the change in state of the processors. The outputs are averaged to generate an averaged time interval. A data set and a hash value corresponding to the average time interval is generated and communicated to a distributed database. The distributed database stores the data set and hash value in sequential order and communicates the data set and/or hash value in accordance to the averaged time interval to devices with the appropriate key. A clock of the devices is set/adjusted based on the averaged time interval and/or data set. In some aspects, the device may automatically adjust the device clock from a first time to a second time in accordance to the averaged time interval and in response to receiving hash and/or dataset.

Figure 5:
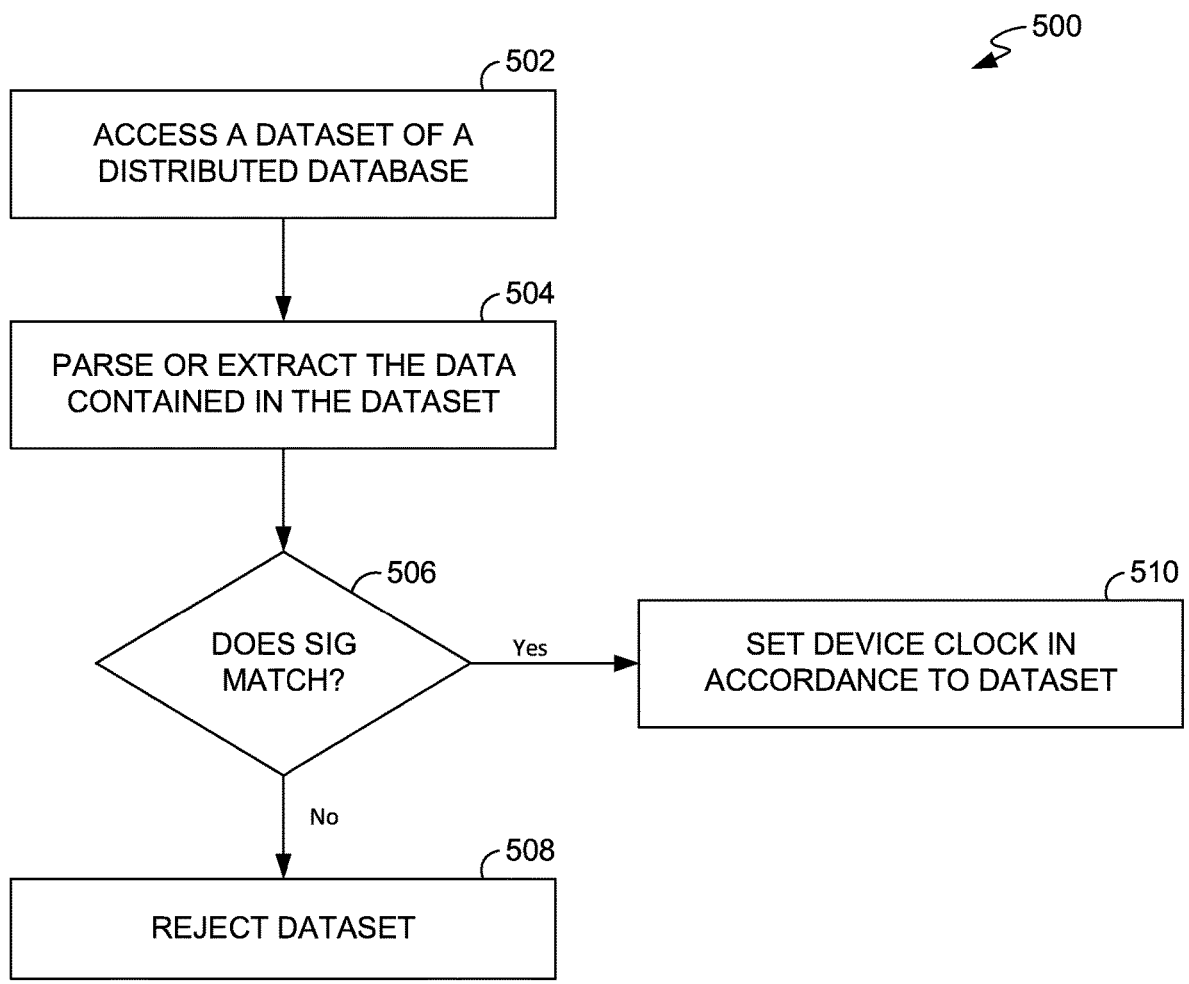
FIG. 5 depicts an exemplary method for setting a device clock, according to an aspect herein.

With reference to FIG. 5, a method 500 is provided depicting an example initial device clock setup facilitated by aspects described herein. Generally, an entry into a distributed ledger is accessed or received by a device. The entry is accessed, by for example a key stored by the device and the entry is read. In some aspects the device may parse or extract the data contained in the entry, for example time stamp 452 and system signature 456. The devices clock is set based on the time stamp 452 contained in the entry and, in some aspects, the collective latency inherent in the network. In some aspects, the authenticity of the entry is verified by the system signature 456 prior to setting the device clock. Once the entry is verified, in some aspects the specific instance of the distributed database that provided the device with the entry is added to a trusted list stored by the device. A device may not require verification of the source of the data thereafter, may periodically re-verify the source, and/or may verify the source each time an entry is read.

At block 502, a dataset of a distributed database, such as stored by database 110,210, is accessed and/or received by a device. In some aspects, the entry is a dataset (such as data set 450) in a blockchain stored by a distributed database. The device may access/receive the dataset by providing a key to the distributed database. In some aspects the subscribing device provides a public key associated with the private key used to sign the data set. In some aspects the subscribing device provides a private key associated with one of the public key(s) used to sign the data set.

At block 504, the device may parse or extract the data contained in the dataset. For example, time stamp 452, count 454, hash 460, and/or system signature 456 may be parsed by a device. In some embodiments, at block 506, the device may verify that the system signature 456 (indicating the authoring system originally creating the entry) is the expected signature. Additionally, and or alternatively, the device may use the hash 460 to verify the dataset's authenticity. Once the dataset is verified, in some aspects the specific instance of the distributed database that provided the device with the entry is added to a trusted list stored by the device. A device may not require verification of the source of the data from trusted sources, may periodically re-verify the source, intermittently re-verify, and/or may verify the source each time a dataset is read. In some aspects, if the dataset is verified the device may communicate to other subscribing devices that the specific instance of the distributed database is trustworthy indicating that the other subscribing devices may add the specific instance of the distributed database to a trusted list and not require independent verification of the datasets stored with that specific instance of the distributed database. In some aspects, if the dataset is not verified (the system signature is not the expected signature) the method 500 proceeds to block 508.

In block 508, if the dataset cannot be verified the dataset 450 is rejected and the device may request a new dataset from the distributed database. In some aspects, the device may access the same instance of the distributed database, a different instance of the distributed database, and/or a plurality of instances of the distributed database. In some aspects of block 508, the specific instance of the distributed database that supplied, sent, communicated, provided access to the dataset 450 may be reported to other subscribing devices as untrustworthy. In some aspects of block 508 the device may return to block 502.

At block 510, a clock is set for the device. In some aspects, the clock is set based on a timestamp contained in the distributed ledger entry. In some aspects, the clock is set based on a transaction number assigned to the dataset by the distributed database and the averaged time interval. For example, if the transaction number is 6220 and the averaged time interval is μs, the device may set the device clock to 6220 μs. Additionally, and/or alternatively, the dataset 450 may comprise a count 454 generated by counter 436. In such an aspect, the device clock may be set based on the count and the averaged time interval. The averaged time interval may be determined by data included in the dataset 450 and/or defined by the terms of the subscription to the average time interval network. Additionally, in some aspects, the clock may be set by correcting the time indicated by the data set by the latency accumulated between creation of the dataset and receipt by the device. For example, and in brief reference to FIG. 4 communication of data set 450 and/or hash 460 may introduce delays ($D_x$—collectively 470) during transmission through a network to the instances of the distributed databases 461 and devices. Said another way, the device(s) facilitating a financial exchange 480 may set a device clock based on the dataset 450, $D_a$ 471, and $D_d$ 474; the device(s) facilitating management of a power plant/power grid 490 may set a device clock based on dataset 450, $D_a$ 471, and $D_c$ 473; and, the device(s) facilitating the communication network 200 may set a device clock based on dataset 450 and $D_b$ 472 (and any other latency created downstream to the individual devices). Accordingly, if the dataset 450 indicates that the time is 6220 ns, $D_b$ 472 is 2 ns the device clock may be set to 6222 ns. In some aspects, the device may automatically adjust the device clock from a first time to a second time in accordance to the averaged time interval and in response to receiving hash and/or dataset.

Aspects of method 500 may include additional, fewer, and/or alternative blocks. Aspects of method 500 may be facilitated by some or all of the components, systems, and processes described herein. Additionally, some aspects of method 500 may be performed simultaneously, in parallel, and/or in an alternative sequence.

Figure 6:
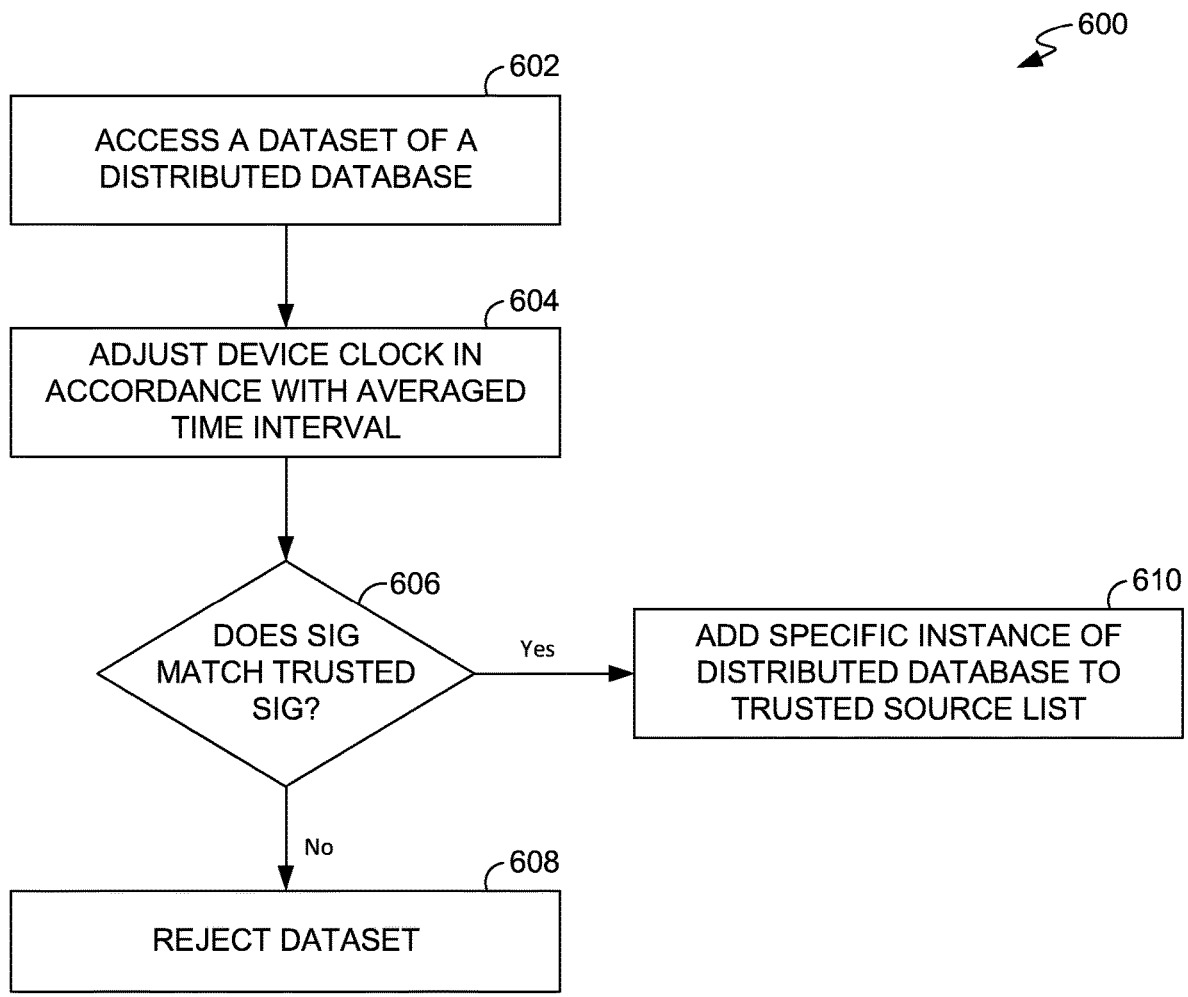
FIG. 6 depicts another exemplary method for adjusting a device clock.

With reference to FIG. 6, a method 600 is provided depicting an example of adjusting a device clock in accordance with aspects described herein. Generally, an entry (such as dataset 450) stored in a distributed ledger is accessed or received by a device. The entry is accessed, by for example a key stored by the device and the entry is read. In response to accessing, receiving, or detecting the receipt of the entry the device adjusts the device's clock by a time interval at least partially based on the averaged time interval. In some aspects the device may parse or extract the data contained in the entry to validate the adjustment.

At block 602, an entry into a distributed ledger, such as stored by database 110,210, is accessed and/or received by a device. In some aspects, the entry is a dataset (such as data set 450) in a blockchain stored by a distributed database. The device may access/receive the dataset by providing a key to the distributed database (such as database 110,210,461). In some aspects, the subscribing device provides a public key associated with the private key used to sign the data set. The public key may be provided to the distributed database by the device requesting access to the dataset. In some aspects, the operator of the averaged time interval system provides operators of subscribing devices digital copies of the public key. In some aspects the subscribing device provides a private key associated with one of the public key(s) used to sign the dataset. The private key may be provided to the distributed database by the device requesting access to the dataset. In some aspects, the operators of subscribing devices provide digital copies of a public key generated from the operator's private key to the operator of the averaged time interval system. In either circumstance, the appropriate key may be provided to an impulse averaging module, such as impulse averaging module 430, via manual or automatic submission for use in signing the datasets.

At block 604, a clock is adjusted for the device. In some aspects, the clock is adjusted in accordance with the averaged time interval. For example, if the averaged time interval is 1 μs, the clock is adjusted by 1 μs. In some aspects, the clock is adjusted based on the averaged time interval. If the averaged time interval is a smaller chronologic increment than the device is capable of using and/or smaller than the device's operations require the device may use the transaction number, the count 454, and/or the timestamp 452 to round or truncate the average time interval to the nearest relevant increment and adjust the device's clock as needed. For an illustrative example, a device clock may be capable of adjustments and/or only control operations that require µs accuracy. However, the device may subscribe to an averaged time interval network that provides ps averaged time intervals. The device may parse and/or extract the timestamp 452 and round the timestamp to the nearest applicable unit. Continuing with the example provided immediately above, prior to receipt of the dataset the device clock may be set at 100,000 µs. The device may then access or receive the dataset which may indicate that the time at the dataset's creation is 100,000,500,000 ps. The device may then round (and/or convert) 100,000,500,000 ps to 100,001,000,000 ps (or 100,001 µs). In this specific case, the device clock would be adjusted by 1 µs. Alternatively, the device may parse and/or extract the timestamp 452 and truncate the timestamp 452 to the applicable unit and adjust (or maintain) the device clock according to the truncated time stamp. For example, returning to the previous example, the device may truncate (and convert) 100,000,500,000 ps to 100,000,000,000 ps (100,000 µs). In this specific case the device clock would not be adjusted, but those skilled in the art will understand that this is merely an example of truncation meant to illustrate aspects described herein. Similarly, the device may use the count 454, or the transaction number in combination with the averaged time interval to perform the same rounding or truncation.

In some aspects of method 600, at block 606, the device may validate the dataset. The device may parse or extract the data contained in the dataset 450. The device may verify that the system signature 456 (indicating the authoring system originally creating the entry) is the expected signature. Additionally, and or alternatively, the device may use the hash 460 to verify the dataset's authenticity. In some aspects, if the dataset is verified the method 600 proceeds to block 610. In some aspects, if the dataset is not verified (the system signature is not the expected signature) the method 600 proceeds to block 608.

At block 608, if the dataset cannot be verified the dataset 450 is rejected and the device may request a new dataset from the distributed database. In some aspects, the device may access/request the dataset from the same instance of the distributed database, a different instance of the distributed database, and/or a plurality of instances of the distributed database. In some aspects of block 608, the specific instance of the distributed database that supplied, sent, communicated, provided access to the dataset 450 may be reported to other subscribing devices as untrustworthy. In some aspects of block 608 the device may return to block 502.

In some aspects, at block 610, if the dataset is verified, the specific instance of the distributed database that provided the device with the dataset (such as dataset 450) is added to a trusted list stored by the device. A device may not require verification of the source of the data from trusted sources, may periodically re-verify the source, intermittently re-verify, and/or may verify the source each time a dataset is read. In some aspects, if the dataset is verified the device may communicate to other subscribing devices that the specific instance of the distributed database is trustworthy—indicating that the other subscribing devices may add the specific instance of the distributed database to a trusted list and not require independent verification of the datasets stored with that specific instance of the distributed database.

Aspects of method 600 may include additional, fewer, and/or alternative blocks. Aspects of method 600 may be facilitated by some or all of the components, systems, and processes described herein. Additionally, some aspects of method 600 may be performed simultaneously, in parallel, and/or in an alternative sequence.

Figure 7:
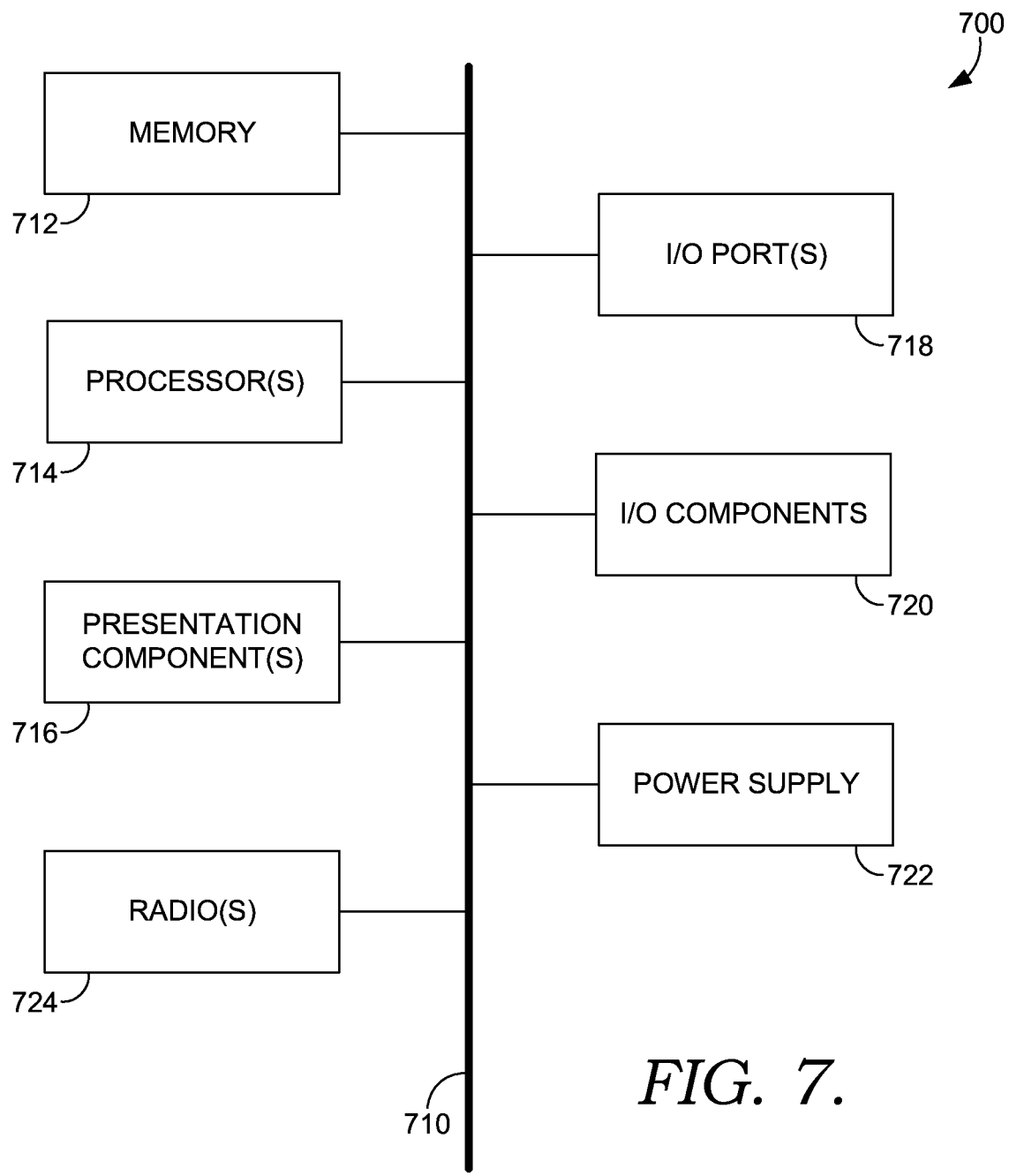
FIG. 7 depicts an exemplary computing device suitable for use in implementing aspects herein.

With reference to FIG. 7, computing device 700 includes a bus 710 that directly or indirectly couples the following devices: memory 712, one or more processors 714, one or more presentation components 716, input/output (I/O) ports 718, input/output (I/O) components 720, an illustrative power supply 722, and a radio 724. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system comprising:
   at least one processor;
   at least one set of computer codes that when executed by the at least one processor cause the at least one processor to perform operations comprising:
   receiving a plurality of data sets transmitted over a network, wherein each data set in the transmitted plurality of datasets corresponds to one of a plurality of averaged time intervals generated by an impulse averaging module; and
   adjusting a locally maintained clock responsive to receipt of at least one of the received plurality of transmitted datasets and based on a corresponding count value included in the at least one received plurality of transmitted datasets.

2. The computer-implemented method of claim 1, further comprising:
   based on receiving the plurality of data sets, determining a predetermined time interval by the one or more remote computing devices.

3. The computer-implemented method of claim 2, wherein the locally maintained clock is adjusted by the predetermined time interval from a first time to a second time.

4. The computer-implemented method of claim 2, wherein the predetermined time interval is less than or equal to a second.

5. The computer-implemented method of claim 4, wherein the predetermined time interval is greater than or equal to a femtosecond.

6. The computer-implemented method of claim 1, wherein the plurality of data sets comprises a hash value with a digital signature using a private key that is paired with a public key.

7. The computer-implemented method of claim 6, further comprising:
   responsive to receiving the plurality of data sets, verifying the digital signature using a locally stored copy of the public key.

8. The computer-implemented method of claim 7, wherein the plurality of data sets broadcast by a remote node that maintains a copy of a distributed database.

9. The computer-implemented method of claim 6, wherein the hash value is generated by a cryptographic algorithm.

10. The computer-implemented method of claim 1, wherein the one of the plurality of averaged time intervals is defined by a computational-cycle of each of the first set of processors.

11. The method of claim 1, wherein responsive to at least the first signal at least one of the one or more remote computing devices broadcasts a reference time signal.

12. A system comprising:
    at least one first processing cores;
    at least one second processing cores;
    at least one set of computer codes that when executed by the at least one second processing cores cause the at least one second processing cores to perform operations comprising:
    monitoring the at least one first processing cores for a change in state;
    responsive to detecting the at least one first processing cores has changed state, generating a output signal representative of a time interval between the change in state from a first state to a second state; and
    communicating the output signal to a remote sever that is communicatively coupled with a plurality of other second processing cores.

13. The system of claim 12, wherein the change of state occurs during a computational-cycle of the at least on first processing cores.

14. The system of claim 12, further comprising a sensor communicatively coupled to the at least one second processing cores, wherein the sensor comprises a zero crossing detector, a threshold detector, or a threshold limiter.

15. The system of claim 12, wherein the time interval between the change in state from the first state to the second state is in a range of less than or equal to 1 second and greater than or equal to 1 femto second.

16. The system of claim 12, wherein the system further comprises:
    the remote sever;
    non-transitory storage medium storing computer instructions that when executed by at least one processor associated with the remote server cause the at least one processor to perform operations comprising:
    monitoring the output signal of a plurality of second processing cores;
    responsive to the output signal of the plurality of second processing cores, generating an averaged time interval from the monitored output signal of the plurality of second processing cores; and
    transmitting a data package over a network in accordance with the averaged time interval.

17. The system of claim 16, wherein the data package comprises a digitally signed hash value.

18. A system comprising:
    at least one processor;
    at least one set of computer codes that when executed by the at least one processor cause the at least one processor to perform operations comprising:
    retrieving a public key from a device storing an instance of a distributed database;
    detecting a data set transmitted over a network that includes the distributed database, the data set signed by a private key that corresponds to the public key and transmitted over the network in accordance with a time interval generated based on a change of state of a plurality of processors; and
    adjusting a local device clock responsive to detection of the data set.

19. The system of claim 18, wherein the time interval indicates the occurrence of a predetermined time interval from a first time to a second time.

20. The system of claim 18, wherein the distributed database is a block chain that receives data from a plurality of entities, the data received from storage is configured to be processed to generate a transaction record that is dependent of previous data stored to the block chain, wherein the transaction record being dependent on previous data stored to the block chain ensures that data stored to the block chain is not modifiable, as later data stored to the block chain continues to be dependent on previous data stored to the block chain.

\* \* \* \* \*